(12) United States Patent
Park et al.

(10) Patent No.: US 12,338,949 B2
(45) Date of Patent: Jun. 24, 2025

(54) HYDROGEN STORAGE DEVICE

(71) Applicants: HYUNDAI MOTOR COMPANY, Seoul (KR); KIA CORPORATION, Seoul (KR)

(72) Inventors: Ji Hye Park, Seoul (KR); Won Jung Kim, Seoul (KR); Kyung Moon Lee, Uiwang-si (KR); Dong Hoon Nam, Suwon-si (KR); Young Jin Cho, Gimhae-si (KR); Byeong Soo Shin, Uiwang-si (KR); Ji Hoon Lee, Uiwang-si (KR); Suk Hoon Hong, Seoul (KR); Hoon Mo Park, Seongnam-si (KR); Yong Doo Son, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/119,914

(22) Filed: Mar. 10, 2023

(65) Prior Publication Data

US 2024/0117930 A1 Apr. 11, 2024

(30) Foreign Application Priority Data

Oct. 11, 2022 (KR) .......................... 10-2022-0129870

(51) Int. Cl.
*F17C 1/00* (2006.01)

(52) U.S. Cl.
CPC ........ *F17C 1/00* (2013.01); *F17C 2203/0636* (2013.01); *F17C 2221/012* (2013.01); *F17C 2223/0138* (2013.01)

(58) Field of Classification Search
CPC .......... C01B 3/0005; F17C 1/00; F17C 11/00; F17C 11/0005; F17C 2203/0636; F17C 2221/012; F17C 2223/0138
(Continued)

(56) References Cited

U.S. PATENT DOCUMENTS

| 4,446,111 A | 5/1984 | Halene et al. |
| 4,522,159 A | 6/1985 | Engel et al. |

(Continued)

FOREIGN PATENT DOCUMENTS

| JP | H05256399 A | 10/1993 |
| JP | 2003254499 A | 9/2003 |

(Continued)

OTHER PUBLICATIONS

Hydrogen Storage Tank for Renewable Energy, Japan Steel Works M&E, Inc., 1 page, https://www.jsw-me.com/en/products/04.html; 2021.

(Continued)

*Primary Examiner* — Bryon P Gehman
(74) *Attorney, Agent, or Firm* — Lempia Summerfield Katz LLC

(57) ABSTRACT

A hydrogen storage device includes a storage container having an accommodation space in an interior thereof, a first metal hydride material provided in the interior of the storage container and that stores hydrogen, and a second metal hydride material provided in the interior of the storage container and that stores the hydrogen at a pressure that is different from that of the first metal hydride material. An advantageous effect of restraining an excessive rise of a pressure of the storage container and enhancing safety and reliability may be obtained.

9 Claims, 6 Drawing Sheets

(58) Field of Classification Search
USPC .................................................. 206/0.6, 0.7
See application file for complete search history.

(56) References Cited

U.S. PATENT DOCUMENTS

| | | | |
|---|---|---|---|
| 4,523,548 A | 6/1985 | Engel et al. | |
| 4,609,038 A | 9/1986 | Ishikawa et al. | |
| 4,667,815 A * | 5/1987 | Halene | F17C 11/005 53/400 |
| 5,953,922 A * | 9/1999 | Stetson | F17C 11/005 62/46.2 |
| 6,015,041 A | 1/2000 | Heung | |
| 7,112,239 B2 | 9/2006 | Kimbara et al. | |
| 7,637,292 B2 | 12/2009 | Handa | |
| 7,850,034 B2 * | 12/2010 | Munshi | F17C 5/04 220/560.04 |
| 7,870,878 B2 | 1/2011 | Zhevago et al. | |
| 8,281,820 B2 | 10/2012 | White | |
| 8,287,629 B2 | 10/2012 | Fujita et al. | |
| 8,430,237 B2 * | 4/2013 | Westenberger | F17C 7/00 220/560.1 |
| 8,607,830 B2 | 12/2013 | White | |
| 8,940,083 B2 * | 1/2015 | De Rango | C01B 3/0005 206/0.7 |
| 8,985,319 B2 * | 3/2015 | Chaise | C01B 3/0042 206/0.7 |
| 9,033,178 B2 | 5/2015 | White | |
| 9,169,976 B2 * | 10/2015 | Peterson | C01B 3/0005 |
| 10,829,370 B2 * | 11/2020 | Collins | F17C 11/005 |
| 11,761,713 B2 | 9/2023 | Park et al. | |
| 2004/0074144 A1 | 4/2004 | Isogai et al. | |
| 2005/0000234 A1 | 1/2005 | Kimbara et al. | |
| 2007/0000561 A1 | 1/2007 | Handa | |
| 2008/0209916 A1 | 9/2008 | White | |
| 2008/0209918 A1 | 9/2008 | White | |
| 2009/0078909 A1 | 3/2009 | Yagi et al. | |
| 2009/0120811 A1 | 5/2009 | Zhevago et al. | |
| 2010/0024542 A1 | 2/2010 | Yen et al. | |
| 2010/0219087 A1 | 9/2010 | Fujita et al. | |
| 2012/0222971 A1 | 9/2012 | Gillia et al. | |
| 2012/0222972 A1 | 9/2012 | Chaise et al. | |
| 2013/0056111 A1 | 3/2013 | White | |
| 2013/0175006 A1 | 7/2013 | Robinson et al. | |
| 2016/0185210 A1 | 6/2016 | Lee | |
| 2019/0273271 A1 | 9/2019 | Inagaki | |

FOREIGN PATENT DOCUMENTS

| | | |
|---|---|---|
| JP | 2004060815 A | 2/2004 |
| JP | 2005063703 A | 3/2005 |
| JP | 2007333158 A | 12/2007 |
| JP | 4119304 B2 | 5/2008 |
| JP | 2008303955 A | 12/2008 |
| JP | 2010202470 A | 9/2010 |
| JP | 5221715 B2 | 3/2013 |
| JP | 2015096745 A | 5/2015 |
| KR | 20090125265 A | 12/2009 |
| KR | 101185175 B1 | 9/2012 |
| KR | 20170131038 A | 11/2017 |
| WO | 2006120808 A1 | 11/2006 |

OTHER PUBLICATIONS

GKN Hydrogen chosen for US Department of Energy hydrogen storage project, GKN Hydrogen, 3 pages, https://www.pm-review.com/gkn-hydrogen-chosen-for-us-department-Of-enerGY-hydrogenstorage-proJect.

Hydrogen Storage Tank for Renewable Energy, Japan Steel Works M&E, Inc., 1 page, https://jsw-me.com/index.html.

Hydrogen Storage Using Metal Hydrides, Guidehouse Insights, Sep. 21, 2021, 3 pages, https://guidehouseinsights.com/news-and-views/hydrogen-storage-using-metal-hydrides.

Ismail Hilali et al., An experimental study to validate optimum distance between metal hydride tanks with staggered arrangement for effective thermal management, International Journal of Hydrogen Energy, vol. 47, Issue 45, Mar. 20, 2022, pp. 19732-19740, https://doi.org/10.1016/j.ijhydene.2022.03.201.

Mykhaylo V. Lototskyy et al., Metal hydride hydrogen storage and supply systems for electric forklift with low-temperature proton exchange membrane fuel cell power module, International Journal of Hydrogen Energy vol. 41, Issue 31, Aug. 17, 2016, pp. 13831-13842.

Office Action cited in U.S. Appl. No. 18/120,164; Mar. 21, 2025; 8 pp.

* cited by examiner

HYDROGEN STORAGE DEVICE

CROSS-REFERENCE TO RELATED APPLICATION

This application claims the benefit of priority to Korean Patent Application No. 10-2022-0129870, filed in the Korean Intellectual Property Office on Oct. 11, 2022, the entire contents of which are incorporated herein by reference.

TECHNICAL FIELD

The present disclosure relates to a hydrogen storage device, and more particularly, to a hydrogen storage device that may restrain a rise in an internal pressure of a storage container according to a change in a temperature of exterior air and enhance safety and reliability while securing a storage capacity of hydrogen of a storage system that stores hydrogen in a solid hydrogen storage scheme.

BACKGROUND

Because hydrogen is in a gaseous state at room temperature and atmospheric pressure, it is stored in a high-pressure gas or liquid hydrogen state or is stored in a form, in which it is chemically bonded to a solid-state/liquid-state material to increase energy density. According to the high-pressure gas storage scheme, hydrogen may be charged due to a physical pressure difference and may be stored easily and rapidly, and a weight storage density thereof increases as it is compressed at a high pressure, and thus it is most widely used for mobility. However, it has a low storage density per volume and there is a limit in further increasing the pressure to increase the storage capacity. Because the liquefied hydrogen has a high energy density per volume but requires high energy to be liquefied into a cryogenic state, and 2% to 3% thereof is evaporated and lost per day, an insulation technology for a container is very important. According to the liquefied hydrogen storage scheme, loss due to boil-off increases as a specific surface area of the container increases so that it is disadvantageous in small capacity storage and is not efficient as a long-time storage scheme.

According to a scheme of chemically bonding hydrogen to a solid-state or liquid-state material to store it, because hydrogen may be stored at a temperature and a pressure that are close to room temperature and atmospheric pressure whereby it is safer than the high pressure gas scheme and it is possible to store hydrogen more stably and for a longer time than the liquefied hydrogen storage scheme. Furthermore, a storage density of the hydrogen may be increased by introducing lower energy than in the scheme of compressing the hydrogen at a high pressure or cooling the hydrogen into a cryogenic state.

In particular, according to the solid hydrogen storage scheme, a spatial utility may be increased because a storage density per unit volume is high, and because hydrogen in a solid storage material is discharged to an outside only when it reaches a specific temperature condition, it is very safe and is advantageous in storing the hydrogen for a long time. When this kind of advantage is applied to a hydrogen-energy storage system (H-ESS), it is possible to stably store regenerative energy having severe changes according to the weather and seasons for a long time.

In the solid hydrogen storage system for stably storing the energy, it is advantageous to apply a metallic material, in which a metal hydride reaction and a reverse direction thereof occurs in a condition around a normal pressure and an atmospheric pressure to easily store and discharge hydrogen. However, conventionally, when hydrogen is stored for a long time at a maximum storage capacity of a storage container, hydrogen stored in a metal hydride material is discharged when a temperature of the storage container increases due to introduction of heat by internal/external factors (for example, a rise in a temperature of exterior air), and thus a pressure of the storage container increases.

Accordingly, conventionally, to prevent a rise in the pressure of the storage container, a pressure-resistant performance or an insulation performance of the storage container is additionally reinforced or hydrogen is unnecessarily discharged (i.e., exhausted to outside of the storage container) according to the rise in the pressure of the storage container. Furthermore, an excessive rise in the pressure of the storage container may be prevented even though a temperature of the storage container is increased, by storing hydrogen at a capacity (a capacity of about 70% to 80% of a maximum storage capacity) that is smaller than the maximum storage capacity of the storage container. However, a hydrogen storage capacity of the storage container is inevitably decreased, and it is difficult to sufficiently utilize the maximum storage capacity of the storage container.

SUMMARY

The present disclosure has been made to solve the above-mentioned problems occurring in the prior art while advantages achieved by the prior art are maintained intact.

An aspect of the present disclosure provides a hydrogen storage device that may restrain a rise in a pressure of hydrogen and enhance safety and reliability while sufficiently securing a hydrogen storage capacity of a storage container that stores the hydrogen in a solid hydrogen storage scheme.

In particular, a purpose of an embodiment of the present disclosure is to store hydrogen safely for a long time at a maximum storage capacity (a maximum hydrogen storage capacity of a storage container) while not being influenced by a change in an exterior temperature of the storage container.

Another aspect of the present disclosure is to restrain deformation of and damage to a storage container due to a rise in a pressure of the storage container.

The technical problems to be solved by the present disclosure are not limited to the aforementioned problems, and any other technical problems not mentioned herein should be clearly understood from the following description by those having ordinary skill in the art to which the present disclosure pertains.

According to an embodiment of the present disclosure for achieving the above-described purposes of the present disclosure, a hydrogen storage device may include a storage container having an accommodation space in an interior thereof, a first metal hydride material provided in the interior of the storage container and that stores hydrogen, and a second metal hydride material provided in the interior of the storage container and that stores the hydrogen at a pressure that is different from that of the first metal hydride material.

This is for restraining an excessive rise in pressure and enhancing safety and reliability while securing a hydrogen storage capacity of the storage container that stores hydrogen in a solid hydrogen storage scheme.

In other words, conventionally, when hydrogen is stored for a long time at a maximum storage capacity of a storage container, hydrogen stored in a metal hydride material is discharged when a temperature of the storage container increases by internal/external factors (for example, a rise in a temperature of exterior air), and thus a pressure of the storage container increases. Furthermore, conventionally, to restrain a rise in the pressure of the storage container, a pressure-resistant performance or an insulation performance of the storage container is additionally reinforced or hydrogen is unnecessarily discharged (exhausted to outside of the storage container) according to the rise in the pressure of the storage container.

An excessive rise in the pressure of the storage container may be prevented, even though a temperature of the storage container is increased, by storing hydrogen at a capacity (a capacity of about 70% to 80% of a maximum storage capacity) that is smaller than the maximum storage capacity of the storage container. However, a hydrogen storage capacity of the storage container is inevitably decreased and it is difficult to sufficiently utilize the maximum storage capacity of the storage container.

According to an embodiment of the present disclosure, the pressure of the storage container may be restrained from being excessively increased even though the temperature of the storage container is increased by the internal/external factors (for example, a rise in the temperature of the exterior air) while not additionally reinforcing an anti-pressure performance or insulation performance of the storage container or discharging the hydrogen to the outside of the storage container. This is achieved by providing the second metal hydride material that stores the hydrogen at a pressure that is different from that of the first metal hydride material in the interior of the storage container.

First of all, according to an embodiment of the present disclosure, because the hydrogen discharged from the first metal hydride material may be stored in the second metal hydride material again due to rises in the temperature and the pressure of the storage container, the hydrogen may be safely stored for a long time at a maximum storage capacity (a maximum hydrogen storage capacity of the storage container) while not being influenced by a change (rise) in the temperature of the storage container.

The accommodation state and form of the first metal hydride material and the second metal hydride material may be variously changed according to a condition and a design specification that are required.

According to an embodiment of the present disclosure, the first metal hydride material may include at least any one of a first metal hydride powder and first metal hydride pellets, and the second metal hydride material may include at least any one of a second metal hydride powder and second metal hydride pellets.

According to an embodiment of the present disclosure, the first metal hydride material may include the first metal hydride powder, the second metal hydride material may include the second metal hydride powder, and the first metal hydride powder and the second metal hydride powder may be mixed to be provided to the interior of the storage container.

According to an embodiment of the present disclosure, it may be defined that the first metal hydride material stores the hydrogen at a first pressure and the second metal hydride material stores the hydrogen at a second pressure that is higher than the first pressure.

In this way, according to an embodiment of the present disclosure, because the hydrogen discharged from the first metal hydride material due to rises in the temperature and the pressure of the storage container may be stored in the second metal hydride material again by providing the second metal hydride material that stores the hydrogen at a pressure that is higher than that of the first metal hydride material in the interior of the storage container, an excessive rise in the pressure of the storage container may be restrained, even though the temperature of the storage container is increased, and the hydrogen may be safely stored for a long time at a maximum storage capacity (a maximum hydrogen storage capacity of the storage container).

Moreover, according to an embodiment of the present disclosure, the hydrogen may be additionally stored by using the second metal hydride material when a storage amount of the hydrogen, which exceeds the maximum storage capacity of the first metal hydride material, is required. This is done by providing the second metal hydride material together with the first metal hydride material in the interior of the storage container.

The accommodation state and form of the first metal hydride material and the second metal hydride material may be variously changed according to a condition and a design specification that are required.

According to an embodiment of the present disclosure, the first metal hydride material may have a first volume, and the second metal hydride material may have a second volume that is smaller than the first volume.

The accommodation state and form of the first metal hydride material and the second metal hydride material may be variously changed according to a condition and a design specification that are required.

According to an embodiment of the present disclosure, the second metal hydride material may surround a circumference of the first metal hydride material while surrounding an inner surface of the storage container.

According to an embodiment of the present disclosure, the first metal hydride material and the second metal hydride material may be alternately disposed along a lengthwise direction of the storage container.

According to an embodiment of the present disclosure, the hydrogen storage device may include a partition member provided at a border of the first metal hydride material and the second metal hydride material.

According to an embodiment of the present disclosure, the partition member may be formed of a porous material, through which the hydrogen passes.

In this way, according to an embodiment of the present disclosure, by providing the partition member at a border of the first metal hydride material and the second metal hydride material, an advantageous effect of maintaining the border and a disposition state (a divided state) of the first metal hydride material and the second metal hydride material more stably may be obtained According to an embodiment of the present disclosure, the hydrogen storage device may include a thermally conductive additive that is mixed with the second metal hydride material.

In this way, according to an embodiment of the present disclosure, because the second metal hydride material may function as a heat transfer medium that transfers heat or cold energy supplied (transferred) to the first metal hydride material more effectively when the hydrogen is stored and discharged by the first metal hydride material (when the first metal hydride material is heated and cooled) by mixing the thermally conductive additive with the second metal hydride material, an advantageous effect of increasing an efficiency of heat transfer to the first metal hydride material and shortening a time for heating and cooling the first metal hydride material may be obtained.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
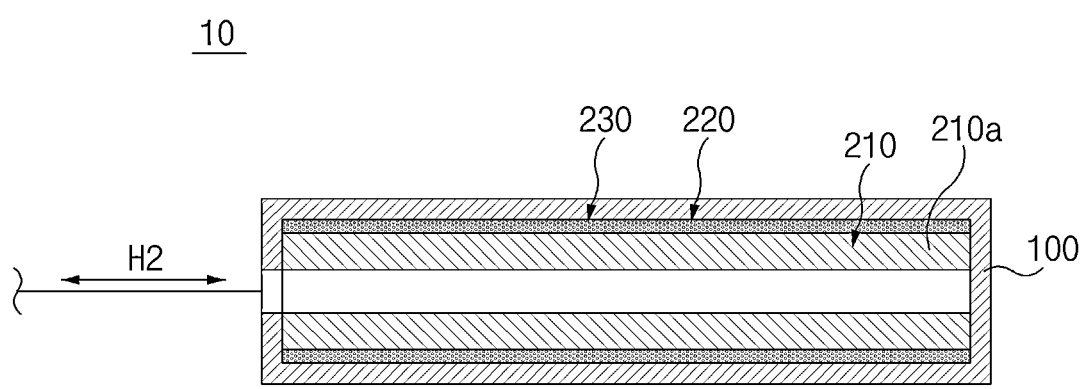
FIG. 1 is a view illustrating a hydrogen storage device according to an embodiment of the present disclosure.

Hereinafter, embodiments of the present disclosure are described in detail with reference to the accompanying drawings.

However, the technical spirits of the present disclosure are not limited to some embodiments but may be implemented in various different forms, and one or more of the components of the embodiments may be selectively coupled or replaced to be used without departing from the technical spirits of the present disclosure.

Furthermore, the terms (including technical and scientific terms) used in the embodiments of the present disclosure may be construed as meanings that may be generally understood by a person having ordinary skill in the art, to which the present disclosure pertains, unless explicitly particularly defined and described, and the meanings of the terms, such as the terms defined in dictionaries, which are generally used may be construed in consideration of the contextual meanings of the related technologies.

In addition, the terms used in the embodiments of the present disclosure are for describing the embodiments, and are not intended to limit the present disclosure.

In the specification, a singular form may include a plural form unless particularly mentioned, and may include one or more of all combinations that may be made by "A", "B", and "C", when at least one (or one or more) of "A", "B", and "C" is described.

In addition, terms, such as first, second, "A", "B", (a), (b) or the like may be used herein when describing components of the present disclosure.

The terms are provided only to distinguish the components from other components, and the essences, sequences, orders, and the like of the components are not limited by the terms.

Furthermore, when it is described that a component is 'connected', 'coupled', or 'electrically connected' to another component, it may include not only the case, in which the former may be directly connected, coupled, or electrically connected to the latter, but also the case, in which the former is 'connected', 'coupled', or 'electrically connected' to the latter via another component therebetween.

In addition, when it is described that a component is formed or disposed "on an upper side of (above or on)" or "on a lower side of (below or under)" another component, it may include not only the case, in which the two components directly contact each other, but also the case, in which one or more third components are formed or disposed between the two components. Further, "on an upper side of (above or on)" or "on a lower side of (below or under)" may mean that an element may be arranged on the lower side of as well as on the upper side of the latter.

Referring to FIGS. 1-6, a hydrogen storage device 10 according to an embodiment of the present disclosure includes a storage container 100 having an accommodation space in an interior thereof, a first metal hydride material 210 that is provided in the interior of the storage container 100 and stores hydrogen, and a second metal hydride material 220 that is provided in the interior of the storage container 100 and stores the hydrogen at a pressure that is different from that of the first metal hydride material 210.

For reference, the hydrogen storage device 10 according to the present disclosure may be used to treat (store and discharge) the required hydrogen, and the present disclosure is neither limited nor restricted by the characteristics and states of the hydrogen treated by the hydrogen storage device 10.

As an example, the hydrogen storage device 10 according to an embodiment of the present disclosure may be used to store hydrogen produced by a hydrogen production facility before the hydrogen is supplied to the source of demand. According to another embodiment of the present disclosure, it is possible to use the hydrogen storage device 10 according to the present disclosure to restore the hydrogen compressed once in advance.

Referring to FIG. 1, the storage container 100 may have various structures having an accommodation space (storage space) in an interior thereof, and the present disclosure is neither limited nor restricted by the structure and form of the storage container 100.

As an example, the storage container 100 may include a cylinder part (not illustrated), and a cap part (not illustrated) that finishes an end of the cylinder part.

The cylinder part may have a hollow cylindrical shape having a circular cross-section, and the cap part may be integrally connected to an end of the cylinder part to finish opposite ends (or one end) of the cylinder part.

For example, the cap part may be fixed to an end of the cylinder part through welding. Otherwise, the cap part may be coupled to or inserted into an end of the cylinder part.

According to another embodiment of the present disclosure, the storage container may have a polygonal (for example, rectangular) cross-section or other cross-sectional shapes.

An inlet/outlet port (not illustrated), through which the hydrogen is introduced and discharged, may be provided at one end (for example, a left end of FIG. 1) of the storage container 100.

In this example, introducing and discharging the hydrogen through the inlet/outlet port is defined to include both supplying the hydrogen into an interior of the storage container 100 from an outside of the storage container 100 or discharging the hydrogen to an outside of the storage container 100 from the interior of the storage container 100.

The inlet/outlet port may have various structures, through which the hydrogen may be introduced and discharged, and the present disclosure is neither limited nor restricted by the structure and form of the inlet/outlet port. For reference, although it is described in an embodiment of the present disclosure that only one inlet/outlet port is provided in the storage container 100, a plurality of inlet/outlet ports may be provided in the storage container according to another embodiment of the present disclosure. Alternatively, it is possible to form the inlet/outlet port not at an end of the storage container but at a central portion of the storage container.

Furthermore, various additional devices, such as a valve (not illustrated) for adjusting an amount of the hydrogen that is introduced into and discharged from the storage container 100 and a safety device (for example, a rupture disk) (not illustrated) for compulsorily discharging the hydrogen when an internal pressure of the storage container 100 is excessively increased, may be provided in the inlet/outlet port of the storage container 100, and the present disclosure is neither limited nor restricted by the kinds and structures of the additional devices.

For reference, the number and disposition of structures of the storage containers 100 that constitute the hydrogen storage device 10 may be various changed according to a condition or a design specification that are required, and the present disclosure is neither limited nor restricted by the number and the disposition of structures of the storage container 100.

As an example, the hydrogen storage device 10 may include a plurality of storage containers 100 that are connected to each other in parallel. According to another embodiment of the present disclosure, the plurality of storage containers 100 that constitute the hydrogen storage device 10 may be connected to each other in series.

The storage container 100 may be cooled or heated by a heat exchanger that passes via the storage container 100 (passes through the storage container 100 or contacts the storage container 100), and the present disclosure is neither limited nor restricted by the kind and structure of the heat exchanger.

As an example, a thermal fluid line (not illustrated) that defines a thermal fluid passage, through which a thermal fluid flows, may be provided in the storage container 100 to pass through the storage container 100, and the storage container 100 may be heated or cooled through heat exchange with the thermal fluid that flows along the thermal fluid line.

A common heat medium or a common cooling medium that may exchange heat with the storage container 100 (the first metal hydride and the second metal hydride) may be used as the thermal fluid that is supplied along the thermal fluid line, and the present disclosure is neither limited nor restricted by the kind and characteristics of the thermal fluid.

According to another embodiment of the present disclosure, the storage container may be heated by using a heating unit, such as an electric heater.

The first metal hydride material 210 is provided in the interior of the storage container 100 such that the hydrogen is stored and discharged through a repeated process of heating and cooling.

In other words, when energy, such as heat, is applied to the first metal hydride material 210, the first metal hydride material 210 may be decomposed into metal elements and hydrogen and then the hydrogen may be discharged. When the hydrogen is compressed at a proper temperature, the metal elements and the hydrogen may be synthesized into the first metal hydride material 210 again and then the hydrogen may be stored.

Various materials that may store and discharge the hydrogen through a repeated process of heating and cooling may be used as the first metal hydride material 210, and the present disclosure is neither limited nor restricted by the kind and characteristics of the first metal hydride material 210.

As an example, the first metal hydride material 210 may include at least any one of an AB5-based alloy, an AB2-based alloy, and an AB-based alloy that may store the hydrogen at a first pressure (or within a first pressure range). For example, the first metal hydride material 210 may be an alloy, main elements of which are $LaNi_5$, TiFe, and $TiMn_2$.

For reference, an operation pressure (for example, a pressure at which the hydrogen is stored) (a first pressure) of the first metal hydride material 210 may be adjusted according to the kind and the contents of the first metal hydride material 210.

The accommodation state and form of the first metal hydride material 210 may be variously changed according to a condition and a design specification that are required, and the present disclosure is neither limited nor restricted by the accommodation state and the form of the first metal hydride material 210.

According to an embodiment of the present disclosure, the first metal hydride material 210 may include at least any one of a first metal hydride powder 210a and first metal hydride pellets 210b.

According to another embodiment of the present disclosure, the first metal hydride material 210 may be provided to have a bulk shape corresponding to the storage container 100 by pressing the first metal hydride powder 210a or the first metal hydride pellets 210b.

The second metal hydride material 220 may be provided in the interior of the storage container 100 such that the hydrogen is stored and discharged through a repeated process of heating and cooling. The second metal hydride material 220 may be configured to store the hydrogen at a pressure that is different from that of the first metal hydride material 210.

In other words, when energy, such as heat, is applied to the second metal hydride material 220, the second metal hydride material 220 may be decomposed into metal elements and hydrogen and then the hydrogen may be discharged. When the hydrogen is compressed at a proper temperature, the metal elements and the hydrogen may be synthesized into the second metal hydride material 220 again and then the hydrogen may be stored.

Various materials that may store the hydrogen through a repeated process of heating and cooling may be used as the second metal hydride material 220, and the present disclosure is neither limited nor restricted by the kind and characteristics of the second metal hydride material 220.

As an example, the second metal hydride material 220 may include at least any one of an AB5-based alloy, an AB2-based alloy, and an AB-based alloy that may store the hydrogen at a second pressure (or within a second pressure range). For example, the second metal hydride material 220 may be an alloy, main elements of which are $LaNi_5$, TiFe, and $TiMn_2$.

For reference, an operation pressure (for example, a pressure at which the hydrogen is stored) (a second pressure) of the second metal hydride material 220 may be adjusted according to the kind and the contents of the second metal hydride material 220.

The accommodation state and form of the second metal hydride material 220 may be variously changed according to a condition and a design specification that are required, and the present disclosure is neither limited nor restricted by the accommodation state and the form of the second metal hydride material 220.

According to an embodiment of the present disclosure, the second metal hydride material 220 may include at least any one of a second metal hydride powder 220a and second metal hydride pellets 220b.

According to another embodiment of the present disclosure, the second metal hydride material 220 may be provided to have a bulk shape corresponding to the storage container 100 by pressing the second metal hydride powder 220a or the second metal hydride pellets 220b.

Figure 2:
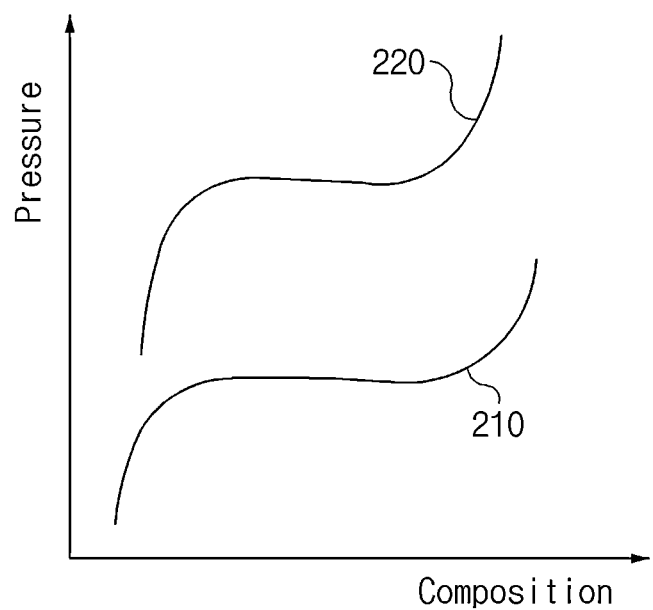
FIG. 2 is a view illustrating hydrogen storage characteristics of a first metal hydride material and a second metal hydride material according to pressures in a hydrogen storage device according to an embodiment of the present disclosure.

Referring to FIG. 2, according to an embodiment of the present disclosure, it may be defined that the first metal hydride material 210 stores the hydrogen at a first pressure and the second metal hydride material 220 stores the hydrogen at a second pressure that is higher than the first pressure.

This is caused by the fact that a pressure of the storage container 100 may be excessively increased as the hydrogen stored in the first metal hydride material 210 is discharged when a temperature of the storage container 100 is increased due to introduction of heat by internal/external factors (for example, a rise in a temperature of exterior air). According to the embodiments of the present disclosure, the pressure of the storage container 100 may be restrained from being excessively increased even though the temperature of the storage container 100 is increased by the internal/external factors (for example, a rise in the temperature of the exterior air) while not additionally reinforcing an anti-pressure performance or insulation performance of the storage container 100 or discharging the hydrogen to the outside of the storage container 100, by providing the second metal hydride material 220 that stores the hydrogen at a pressure that is higher than that of the first metal hydride material 210 in the interior of the storage container 100.

First of all, according to an embodiment of the present disclosure, because the hydrogen discharged from the first metal hydride material 210 may be stored in the second metal hydride material 220 again due to rises in the temperature and the pressure of the storage container 100, the hydrogen may be safely stored for a long time at a maximum storage capacity (a maximum hydrogen storage capacity of the storage container 100) while not being influenced by a change (rise) in the temperature of the storage container 100.

Moreover, according to an embodiment of the present disclosure, the hydrogen may be additionally stored by using the second metal hydride material 220 when a storage amount of the hydrogen, which exceeds the maximum storage capacity of the first metal hydride material 210, is required. This is done by providing the second metal hydride material 220 together with the first metal hydride material 210 in the interior of the storage container 100.

Volumes of the first metal hydride material 210 and the second metal hydride material 220 may be variously changed according to a condition and a design specification that are required.

According to an embodiment of the present disclosure, among the first metal hydride material 210 and the second metal hydride material 220, the first metal hydride material 210 that is operated at a relatively low pressure (the first pressure) may be provided to have a first volume, and the second metal hydride material 220 that is operated at a relatively high pressure (the second pressure) may be provided to have a second volume that is smaller than the first volume.

Alternatively, the first metal hydride material 210 and the second metal hydride material 220 may have the same volume, or the second metal hydride material 220 may have a volume that is larger than that of the first metal hydride material 210.

Disposition of structures of the first metal hydride material 210 and the second metal hydride material 220 may be variously changed according to a condition and a design specification that are required, and the present disclosure is neither limited nor restricted by the disposition of structures of the first metal hydride material 210 and the second metal hydride material 220.

As an example, referring to FIG. 1, the second metal hydride material 220 may be configured to surround a circumference of the first metal hydride material 210 while surrounding an inner surface of the storage container 100.

For example, the second metal hydride material 220 (for example, the second metal hydride pellets) may be formed to have a hollow cylindrical shape having a diameter corresponding to an inner diameter of the storage container 100 and may be attached to the inner surface of the storage container 100. The first metal hydride material 210 (for example, the first metal hydride powder) may be accommodated in an interior of the second metal hydride material 220.

Figure 3:
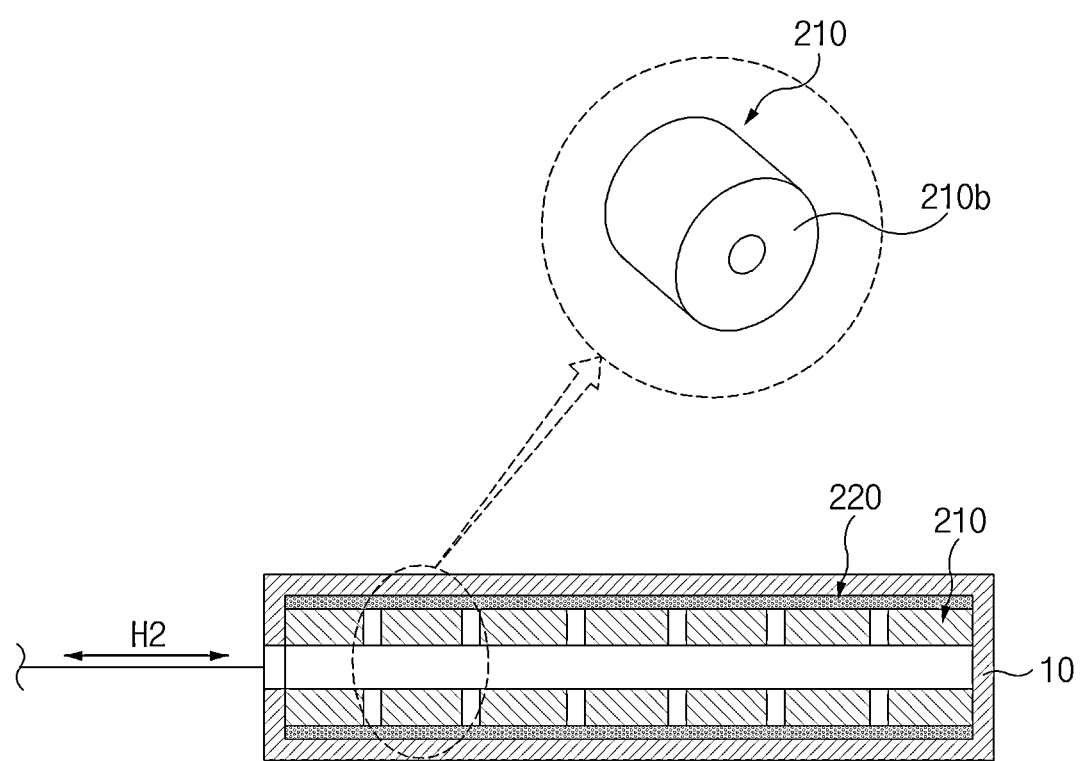
FIG. 3 is a view illustrating a modification of a first metal hydride material in a hydrogen storage device according to an embodiment of the present disclosure.

As another example, referring to FIG. 3, the second metal hydride material 220 may be configured to surround a circumference of the first metal hydride material 210 while surrounding an inner surface of the storage container 100, and the first metal hydride material 210 may be formed by stacking the plurality of first metal hydride pellets 210b having a substantially hollow cylindrical shape such that the first metal hydride pellets 210b are spaced apart from each other (or attached to each other) along a lengthwise direction of the storage container 100.

Although it is described in the above-described and illustrated embodiment of the present disclosure that the second metal hydride material 220 surrounds a circumference of the first metal hydride material 210, it is possible to dispose the first metal hydride material 210 and the second metal hydride material 220 along the lengthwise direction of the storage container 100 according to another embodiment of the present disclosure.

Figure 5:
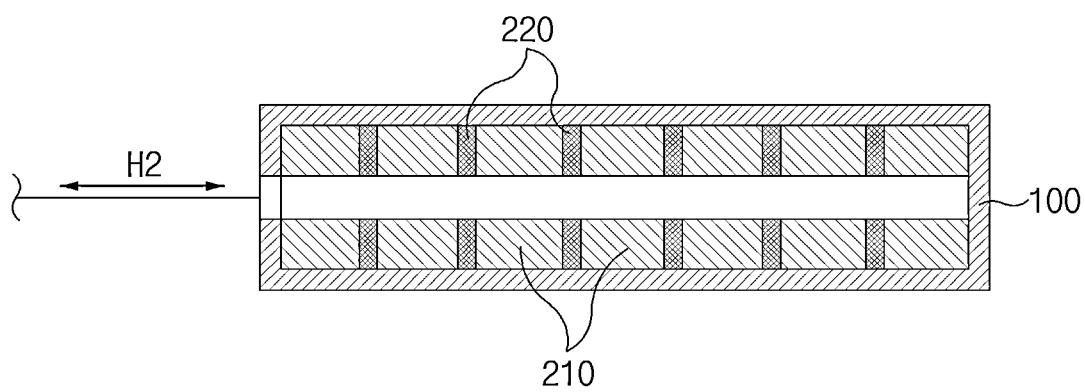
FIG. 5 is a view illustrating a modification of a second metal hydride material in a hydrogen storage device according to an embodiment of the present disclosure.

Referring to FIG. 5, according to an embodiment of the present disclosure, the first metal hydride material 210 and the second metal hydride material 220 may be alternately disposed along the lengthwise direction of the storage container 100.

For example, the first metal hydride material 210 may be formed by disposing the plurality of first metal hydride pellets 210b having a substantially hollow cylindrical shape such that the first metal hydride pellets 210b are spaced apart from each other by a specific interval. The second metal hydride material 220 may be formed by disposing the plurality of second metal hydride pellets 220b having a substantially hollow disk shape such that the second metal hydride pellets 220b are disposed between the adjacent first metal hydride pellets 210b.

According to another embodiment of the present disclosure, it is possible to irregularly dispose the first metal hydride material 210 and the second metal hydride material 220 along the lengthwise direction of the storage container 100.

Figure 4:
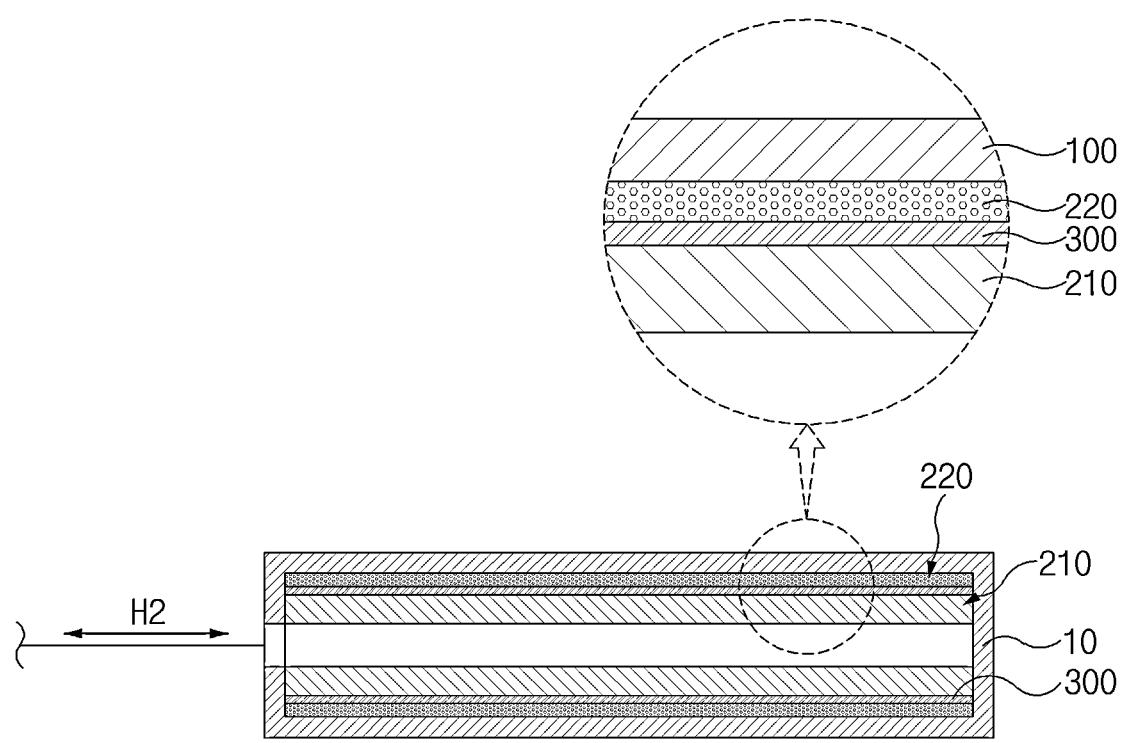
FIG. 4 is a view illustrating a partition member in a hydrogen storage device according to an embodiment of the present disclosure.

Referring to FIG. 4, according to an embodiment of the present disclosure, the hydrogen storage device 10 may include a partition member 300 that is provided at a border of the first metal hydride material 210 and the second metal hydride material 220.

As an example, the partition member 300 may be provided continuously along the border of the first metal hydride material 210 and the second metal hydride material 220.

The kind and the material of the partition member 300 may be variously changed according to a condition and a design specification that are required, and the present disclosure is neither limited nor restricted by the kind and the material of the partition member 300.

According to an embodiment of the present disclosure, the partition member 300 may be formed of a porous material (a porous material or a mesh structure having pores that may restrain flows of the metal hydride powder while allowing flows of the hydrogen), through which the hydrogen may pass. As an example, a porous filter may be used as the partition member 300.

According to another embodiment of the present disclosure, a membrane or a plate having through-holes, through which hydrogen may pass, instead of the porous material may be used as the partition member 300.

In this way, according to an embodiment of the present disclosure, by providing the partition member 300 at a border of the first metal hydride material 210 and the second metal hydride material 220, an advantageous effect of maintaining the border and a disposition state (a divided state) of the first metal hydride material 210 and the second metal hydride material 220 more stably may be obtained.

According to an embodiment of the present disclosure, the hydrogen storage device 10 may include a thermally conductive additive 230 that is provided while being mixed with the second metal hydride material 220.

Various additives having a thermal conductivity may be used as the thermally conductive additive 230, and the present disclosure is neither limited nor restricted by the kind and the characteristics of the thermally conductive additive 230.

As an example, graphene, ENG, carbon fibers, and the like, which are carbon-based additives of a high thermal conductivity may be used as the thermally conductive additive 230.

In this way, according to an embodiment of the present disclosure, because the second metal hydride material 220 may function as a heat transfer medium that transfers heat or cold energy supplied (transferred) to the first metal hydride material 210 more effectively when the hydrogen is stored and discharged by the first metal hydride material 210 (when the first metal hydride material 210 is heated and cooled) by mixing the thermally conductive additive 230 with the second metal hydride material 220, an advantageous effect of increasing an efficiency of heat transfer to the first metal hydride material 210 and shortening a time for heating and cooling the first metal hydride material 210 may be obtained.

According to the above-described and illustrated embodiment of the present disclosure, an example of mixing the thermally conductive additive 230 with the second metal hydride material 220 has been described as an example, but according to another example of the present disclosure, it is possible to mix the thermally conductive additive 230 with the first metal hydride material 210.

According to the above-described and illustrated embodiment of the present disclosure, it has been described as an example that the first metal hydride material 210 and the second metal hydride material 220 are individually separated (divided) in the interior of the storage container 100, but according to another embodiment of the present disclosure, it is possible to mix the first metal hydride material 210 and the second metal hydride material 220 to provide a mixture.

Figure 6:
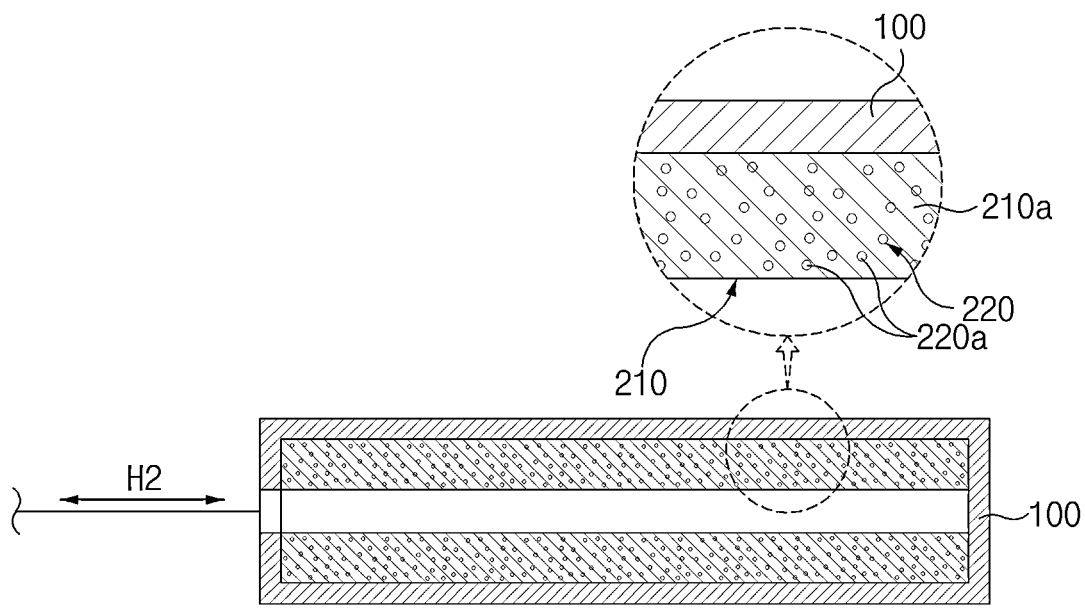
FIG. 6 is a view illustrating another embodiment of a first metal hydride material and a second metal hydride material in a hydrogen storage device according to an embodiment of the present disclosure.

Referring to FIG. 6, the hydrogen storage device 10 according to an embodiment of the present disclosure may include the storage container 100, the first metal hydride material 210, and the second metal hydride material 220. The first metal hydride material 210 may include the first metal hydride powder 210*a*, the second metal hydride material 220 may include the second metal hydride powder 220*a*, and the first metal hydride powder 210*a* and the second metal hydride powder 220*a* may be mixed at random in the interior of the storage container 100.

As described above, according to an embodiment of the present disclosure, a rise in a pressure of hydrogen may be restrained and safety and reliability may be enhanced while a hydrogen storage capacity of a storage container that stores the hydrogen in a solid hydrogen storage scheme is sufficiently secured.

In particular, according to an embodiment of the present disclosure, hydrogen may be stored safely for a long time at a maximum storage capacity (a maximum hydrogen storage capacity of a storage container) while not being influenced by a change in an exterior temperature of the storage container.

Furthermore, according to an embodiment of the present disclosure, deformation of and damage to a storage container due to a rise in a pressure of the storage container may be restrained.

Although the embodiments have been mainly described, they are simply exemplary and do not limit the present disclosure, and those having ordinary skill in the art to which the present disclosure pertains may understand that various modifications and applications may be made without departing from the essential characteristics of the embodiments. For example, the detailed components of the embodiments may be modified. Further, it is construed that the differences related to the modifications and applications defined in the claims also fall within the scope of the present disclosure.

What is claimed is:

1. A hydrogen storage device comprising:
 a storage container having an accommodation space in an interior thereof;
 a first metal hydride material provided in the interior of the storage container and configured to store hydrogen; and
 a second metal hydride material provided in the interior of the storage container and configured to store hydrogen at a pressure that is different from that of the first metal hydride material,
 wherein the first metal hydride material and the second metal hydride material are alternately disposed along a lengthwise direction of the storage container.

2. The hydrogen storage device of claim 1, wherein the first metal hydride material stores the hydrogen at a first pressure, and the second metal hydride material stores the hydrogen at a second pressure that is different from the first pressure.

3. The hydrogen storage device of claim 2, wherein the second metal hydride material includes at least any one of a second metal hydride powder and second metal hydride pellets.

4. The hydrogen storage device of claim 1, wherein the first metal hydride material is configured to have a first volume, and the second metal hydride material is configured to have a second volume that is smaller than the first volume.

5. The hydrogen storage device of claim 1, wherein the second metal hydride material is configured to surround a circumference of the first metal hydride material while surrounding an inner surface of the storage container.

6. The hydrogen storage device of claim 1, wherein the first metal hydride material includes at least any one of a first metal hydride powder and first metal hydride pellets.

7. The hydrogen storage device of claim 1, wherein the first metal hydride material includes a first metal hydride powder,
   wherein the second metal hydride material includes a second metal hydride powder, and
   wherein the first metal hydride powder and the second metal hydride powder are mixed to be provided to the interior of the storage container.

8. The hydrogen storage device of claim 1, further comprising:
   a thermally conductive additive that is mixed with the second metal hydride material.

9. A hydrogen storage device comprising:
   a storage container having an accommodation space in an interior thereof;
   a first metal hydride material provided in the interior of the storage container and configured to store hydrogen;
   a second metal hydride material provided in the interior of the storage container and configured to store hydrogen at a pressure that is different from that of the first metal hydride material; and
   a partition member provided at a border of the first metal hydride material and the second metal hydride material,
   wherein the partition member is formed of a porous material, through which the hydrogen passes.

* * * * *